Aug. 8, 1967

C. WADDINGTON 3,334,590

POWER TRANSMISSION

Filed Sept. 9, 1965

INVENTOR.
CLIVE WADDINGTON
BY
Barnes, Kisselle, Raisch & Choate

*INVENTOR.*
CLIVE WADDINGTON
BY
*Barnes Kisselle, Raisch & Choate*

United States Patent Office 3,334,590
Patented Aug. 8, 1967

3,334,590
POWER TRANSMISSION
Clive Waddington, Birmingham, Mich., assignor to Sperry Rand Corporation, Troy, Mich., a corporation of Delaware
Filed Sept. 9, 1965, Ser. No. 486,052
23 Claims. (Cl. 103—120)

This invention relates to rotary positive displacement piston pumps.

It is an object of this invention to provide an improved rotary positive displacement piston pump which can be used at high pressures and speeds, for example, on the order of 4,500 pounds per square inch and 10,000 r.p.m.; which has pressure compensated variable displacement; which operates with minimum noise; which has hydrostatic balance of the forces therein; which has high efficiency; and wherein the usual problems due to varying pressures caused by compression and decompression are obviated.

Figure 1:
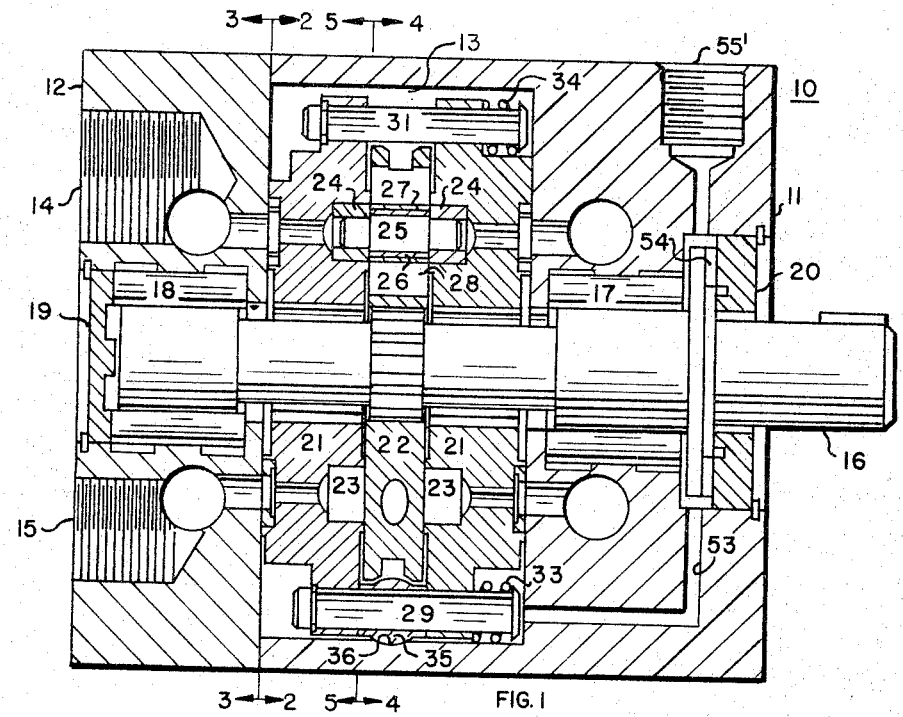
FIG. 1 is a longitudinal sectional view through a rotary positive displacement piston pump embodying the invention.
Figure 2:
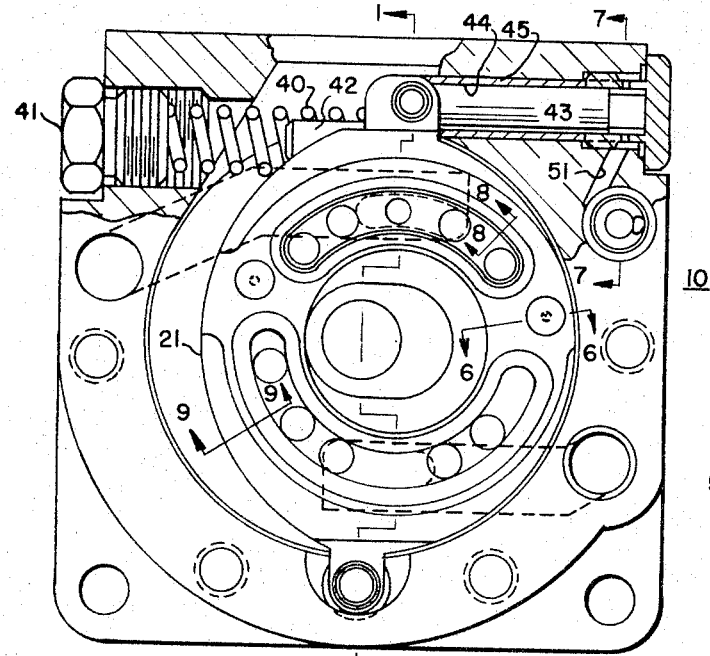
FIG. 2 is a sectional view taken along the line 2—2 in FIG. 1.

Referring to FIGS. 1 and 2, the rotary piston pump embodying the invention comprises a housing 10 including a main body 11 and a cover 12 which enclose a chamber 13 in the housing. The cover 12 includes an inlet 14 and an outlet 15. A drive shaft 16 is journalled in bearings 17, 18 in the housing. The one end of the shaft 16 is sealed by a seal member 19 while the other end projects through a seal member 20. A pair of plates or annulus members 21 are positioned in the chamber 13 on opposite sides of a rotary drive member 22 keyed or splined to shaft 16.

Figure 5:
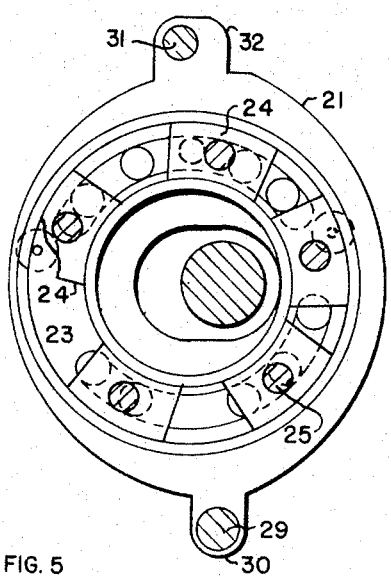
FIG. 5 is a sectional view taken along the line 5—5 in FIG. 1.

Each of the annulus members 21 has an annular groove 23 in the face thereof adjacent the rotary drive member 22. A plurality of segmental piston members 24 are mounted in each groove 23 (FIGS. 1 and 5). A piston drive pin 25 extends through rotary member 22 into engagement with each pair of opposed piston members 24. Each piston drive pin 25 is journalled in a sleeve 26 that in turn extends through a roller 27. The length of each sleeve 26 is slightly greater than the width of the drive plate 22 so that the sleeves 26 engage the faces of the segmental piston members 24 and properly space the piston members 21 relative to one another. Each of the rollers 27 rides in a radial opening 28 (FIG. 4) in the rotary drive member 22.

The annulus members 21 are connected to one another by a pin 29 that extends through projections 30 on the lower end of the members 21 and a pin 31 that extends through projections 32 on the upper end of the members. Springs 33, 34 are interposed between the ends of the pins 29, 31, respectively, and yieldingly urge the annulus members 21 toward the rotary drive member 22. A spherical sleeve 35 is journalled on the lower pin 29 and engages a complementary spherical seat 36 in the chamber 13 to serve as a pivot for the annulus members which move in unison relative to the rotary drive member 22.

Figure 3:
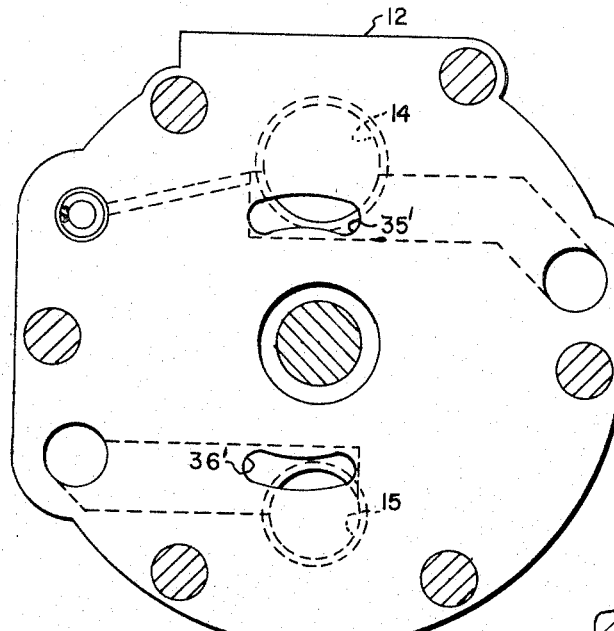
FIG. 3 is a sectional view taken along the line 3—3 in FIG. 1.
Figure 6:
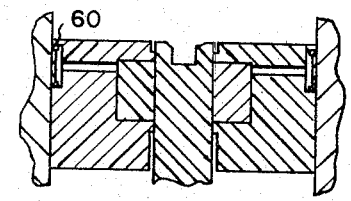
FIG. 6 is a fragmentary sectional view on an enlarged scale taken along the line 6—6 in FIG. 2.
Figure 7:
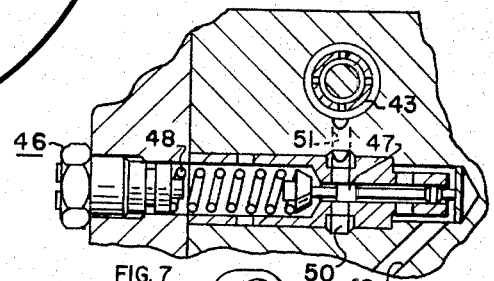
FIG. 7 is a fragmentary sectional view taken along the line 7—7 in FIG. 2.
Figure 4:
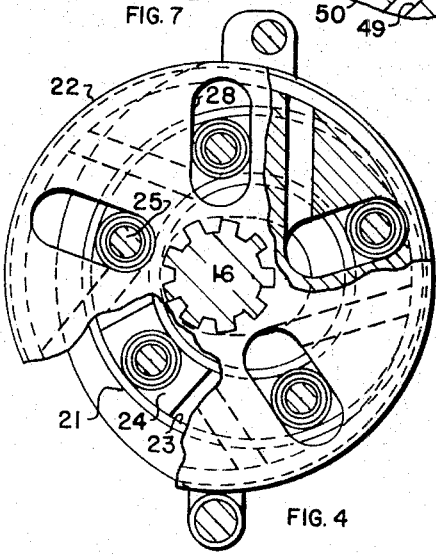
FIG. 4 is a part sectional fragmentary view taken along the line 4—4 in FIG. 1.

As shown in FIG. 4, the annulus members 21 are movable in unison into eccentric relation to the rotary drive member 22 so that when the shaft 16 is rotated, the piston drive pins 25 are also rotated to thereby move the piston members 24 along grooves 23. Since the grooves are in eccentric relation to the rotary member 22, the piston drive pins 25 will be guided by slots 28 radially inwardly and outwardly so that successive pitson members 24 progressively move circumferentially toward and away from one another and thereby pump fluid from arcuate inlet passage 35 and inlet 14 to arcuate outlet passage 36 and outlet 15 (FIGS. 1 and 3). The pressure faces of the piston members 24 form an angle with a radial plane such that the center of the pressure force on each face passes through the center of pin 25.

As shown in FIG. 2, two compression springs 40 are interposed between threaded stops 41 in the housing and guide members 42 which engage annulus members 21 to yieldingly urge the annulus members 21 into position in eccentric relation to the rotary drive member 22. A constant control pressure is applied to the annulus members 21 by a piston 43 that is movable in a bore 44 of a sleeve 45 and engages the pin 31. In addition a varying hydraulic pressure force tends to move the annulus members clockwise or counter-clockwise, due to a downward force caused by the high pressure between the pistons, depending on the position of the annulus members. The position of the annulus members 21 is determined by an equilibrium between the force of the springs 40, the constant pressure due to the plunger 43 and the varying hydraulic force on the annulus members.

The control pressure for controlling piston 43 is derived from operation of a pilot valve 46. The pilot valve 46 comprises a piston 47 which is yieldingly urged toward a position where it obstructs flow to the piston 43 by a spring 48. The outlet pressure is applied through passage 49 to the right end of the piston 47 in yielding opposition to the spring 48. As the outlet pressure increases to the design pressure, the piston 47 is moved to the left permitting fluid to flow through the anular channel 50 and passage 51 to the end of the piston 43 (FIG. 2).

Figure 8:
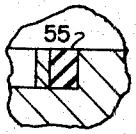
FIG. 8 is a fragmentary sectional view on an enlarged scale taken along the line 8—8 in FIG. 2.

As shown in FIGS. 2 and 8, a rubber O-ring 55 is provided in a kidney-shaped groove adjacent the inlet. The O-ring may be made of any suitable rubber which will withstand the pressures and the physical and chemical action of the hydraulic fluid. The O-ring 55 prevents leakage from the case to the inlet so that any fluid passing to the interior of the housing can drain through the drain passage 53 past the bearing 54 to an outlet 55' (FIG. 1) and thereby provide for cooling of the pump at zero flow.

Figure 9:
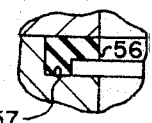
FIG. 9 is a fragmentary sectional view on an enlarged scale taken along the line 9—9 in FIG. 2.

Refering to FIGS. 1, 2 and 9, a pressure seal 56 is provided around the kidney-shaped groove adjacent the outlet and has a stepped shoulder 57. The outlet pressure wieldingly urges the pressure seal 56 outwardly against the housing 10 to provide self-energizing seal. The relative areas and centers of pressure between the kidney groove and annulus groove are such that there is a slightly greater force tending to push the annulus members 21 toward the drive member 22 so that a hydrostatic balance is achieved.

It can be appreciated that the hydrostatic balance that is achieved must necessarily be such that it will produce a hydrostatic balance under the average pressure involved. As the annulus members 21 are pivoted changing the positions of the spaces adjacent the piston members, the pressure forces will be changed. Accordingly, in order to insure a proper hydrostatic balance at all times, trimmer plugs in the form of circular stepped nylon seals 60 are provided in cavities in the outer spaces of the annulus members 21. The trimmer plugs 60 sense any unbalance in forces in the areas which cross between the inlet and the outlet where the trimmer plugs are positioned and tend to apply a force on the anulus members. It can be appreciated that this force may alternate between high pressure, intermediate pressure or inlet pressure so that in effect the trimmer plugs apply a pulsating force to the annulus members.

Figure 10:
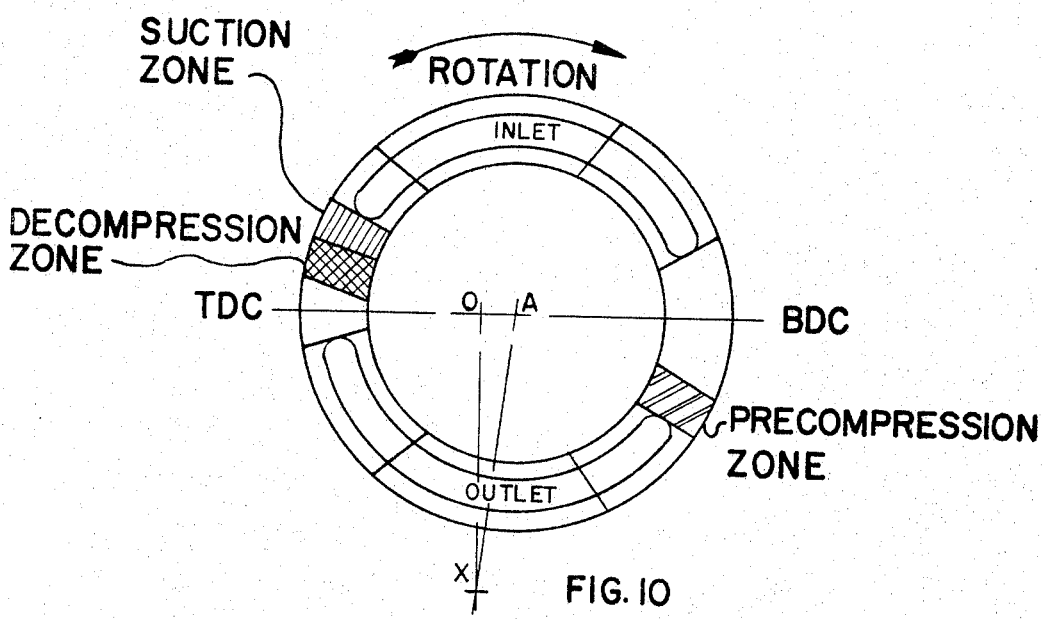
FIGS. 10 and 11 are diagrammatic views of the compression and decompression that occurs in the pump.

Another feature of the invention resides in the provision for preliminarily compressing and decompressing the fluid so that there is a minimum power loss and minimum noise as the pumping occurs. More specifically, the fluid is precompressed before the chamber containing the fluid that is retained in the pump is opened to outlet pressure and decompressed just before the fluid remaining in the chamber is opened to inlet pressure. This is achieved by changing the top dead center position of the pump. Specifically, as shown in FIG. 10, at full flow the top dead center position is so arranged that it occurs along the line marked TDC–BDC.

In the precompression zone, the pistons are approaching one another across the closed center area between inlet and outlet and the pressure of the fluid in the chamber between the pistons is being increased. In the decompression zone, the pistons are receding from one another across the closed area between outlet and inlet and the pressure of the fluid between the cylinders is being reduced. In the subsequent suction zone, the pistons are receding further from one another across the closed area between outlet and inlet. This occurs before the chamber between the pistons is opened to inlet.

In order to insure that there is the correct precompression and decompression as the annulus members are pivoted to minimum flow, it is essential that a proper relationship be achieved between the pivot point X, the drive shaft center O and the center A of the annulus members.

Figure 11:
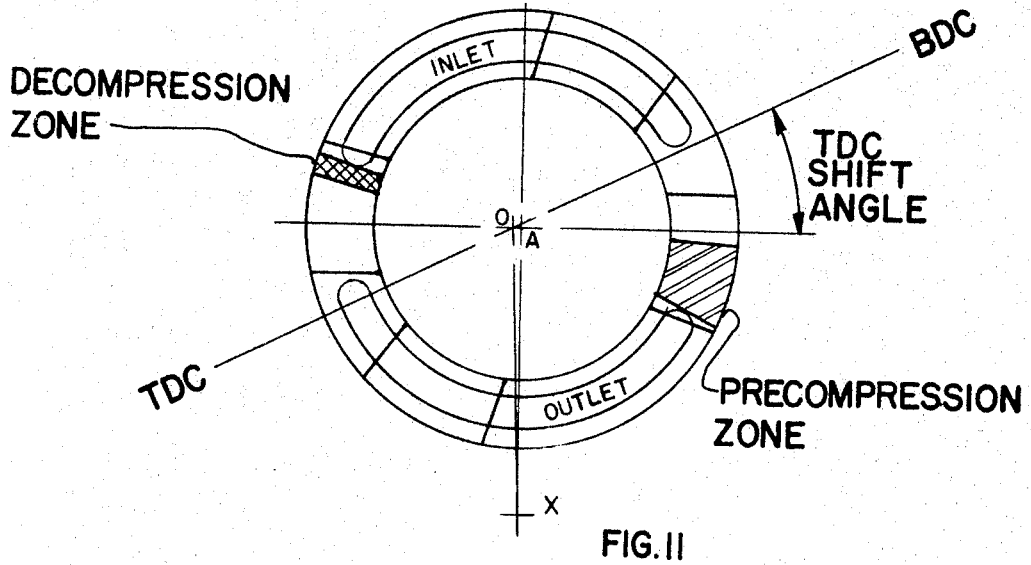

The pivotal point 29 of the anulus members is so related to the top dead center position that at minimum flow the top dead center has swung in an arc to the position shown in FIG. 11, bringing the center A of the annulus members closer to the center O of the drive shaft. This assures that the velocity of the pistons in the transition area between inlet and outlet and outlet and inlet is substantially the same at all times.

Thus, even at minimum flow there is the correct precompression and decompression of the fluid. In the intermediate positions between full flow and minimum flow, a similar compression and decompression is achieved so that there is precompression and decompression at all times and at all rates of fluid flow. The net result of such a construction is that a precompression and decompression occurs which minimizes the power loss and noise.

I claim:
1. In a pump, the combination comprising
a housing having an inlet and an outlet,
a pair of annulus members,
each said annulus member having an anular groove in a face thereof,
means for pivotally mounting said annulus members in said housing about a common axis with the annular grooves thereof in opposed facing relation,
a plurality of segmental piston members mounted in each said annular groove,
a rotary drive member interposed between said annulus members and having means thereon engaging said piston members,
said housing having an inlet fluid passage extending from the path of the spaces between said segmental piston members to said inlet and an outlet fluid passage extending from the path of said spaces between said segmental piston members to said outlet,
spring means yieldingly urging said annulus members into eccentric relation with respect to said rotary drive member,
and pressure responsive means responsive to the outlet pressure and opposing said spring means.

2. The combination set forth in claim 1 including arcuate inlet and outlet grooves in the faces of said annulus members which are opposite said faces in which said anular grooves are present,
and pressure seals in said arcuate outlet grooves engaging surfaces of said housing.

3. The combination set forth in claim 1 including hydrostatic pressure seals in said last mentioned faces responsive to pressure in the areas between the inlet and outlet for applying varying forces to said annulus members.

4. The combination set forth in claim 1 wherein said means for pivotally mounting said annulus members in said housing comprises a pin pivotally connected to said annulus members and spherical member on said pin having a spherical surface engaging a portion of said housing whereby said assembly of annulus members is capable of pivotal movement as well as limited transverse movement.

5. The combination set forth in claim 1 wherein said rotary drive member has a groove in the periphery thereof and a plurality of passages extending inwardly from said groove radially toward the center of said rotary drive member.

6. In a pump, the combination comprising
a housing having an inlet and an outlet,
a pair of annulus members,
each said annulus member having an annular groove in a face thereof,
means for pivoting said annulus members in said housing about a common axis with the annular grooves thereof in opposed relation,
a plurality of segmental piston members in each said annular groove,
said segmental piston members being spaced from one another to define spaces therebetween,
a rotary drive member interposed between said annulus members,
said rotary drive member having a plurality of generally radially extending openings therethrough,
a sleeve interposed in each said opening,
a pin extending through each said sleeve and engaging opposed segmental piston members in the opposed annular grooves,
said housing having an inlet fluid passage extending from the path of the spaces between said segmental piston members to said inlet,
said housing having an outlet fluid passage extending from the path of the spaces between said segmental piston members to said outlet,
spring means yieldingly urging said annulus members into eccentric relation with respect to said rotary drive member,
and pressure responsive means opposing said spring means and tending to urge said rotary drive member into eccentric relation with said annular groove.

7. The combination set forth in claim 6 including rollers overlying said sleeves,
the length of each said sleeve being slightly greater than the width of each said drive member whereby said sleeves engage faces of said piston members and properly space said piston members relative to one another.

8. In a pump, the combination comprising
a housing having an inlet and an outlet,
an annulus member, said annulus member having an annular groove in a face thereof,
means for pivotally mounting said annulus member in said housing,
a plurality of segmental piston members mounted in said annular groove,
a rotary drive member positioned adjacent said annulus member and having means thereon engaging said piston members,
said housing having an inlet fluid passage extending from the path of the spaces between said segmental piston members to said inlet and an outlet fluid passage extending from the path of said spaces between said segmental piston members to said outlet,
spring means yieldingly urging said annulus member into eccentric relation with respect to said rotary drive member,
and pressure responsive means responsive to the outlet pressure opposing said spring means.

9. The combination set forth in claim 8 wherein said means for pivotally mounting said annulus member in said housing comprises a pin pivotally connected to said annulus member and spherical member on said pin having spherical surface engaging a portion of said housing whereby said annulus member is capable of pivotal movement as well as limited transverse movement.

10. The combination set forth in claim 8 wherein said rotary drive member has a groove in the periphery thereof and a plurality of passages extending inwardly from said groove radially toward the center of said rotary drive member.

11. In a pump, the combination comprising
a housing having an inlet and an outlet,
a pair of annulus members,
each said annulus member having an annular groove in a face thereof,
means for pivoting said annulus members in said housing about a common axis with the annular groove thereof in opposed relation,
a plurality of segmental piston members in each said annular groove,
said segmental piston members being spaced from one another to define spaces therebetween,
a rotary drive member interposed between said annulus members,
said rotary drive member having a plurality of generally radially extending openings therethrough,
a sleeve interposed in each said opening,
a pin extending through each said sleeve and engaging opposed segmental piston members in the opposed groove,
said housing having an inlet fluid passage extending from said inlet to the spaces between said segmental piston members,
said housing having an outlet fluid passage extending from said outlet to the spaces between said segmental piston members,
and means for moving said rotary drive member into eccentric relation with respect to said annular groove.

12. The combination set forth in claim 11 wherein said last mentioned means includes yielding means urging said annulus members into eccentric relation.

13. The combination set forth in claim 11 including rollers overlying said sleeves,
the length of each said sleeve being slightly greater than the width of said drive member whereby said sleeves engage opposed faces of said piston members and properly space said piston members relative to one another.

14. In a pump, the combination comprising
a housing having an inlet and an outlet,
a pair of annulus members,
each said annulus member having an annular groove in a face thereof,
means for pivotally mounting said annulus members in said housing about a common axis with the annular grooves thereof in opposed facing relation,
a plurality of segmental piston members mounted in each said annular groove,
a rotary drive member interposed between said annulus members and having means thereon engaging said piston members,
said housing having an inlet fluid passage extending from the path of the spaces between said segmental piston members to said inlet and an outlet fluid passage extending from the path of said spaces between said segmental piston members to said outlet,
spring means yieldingly urging said annulus members into eccentric relation with respect to said rotary drive member,
and pressure responsive means responsive to the outlet pressure and opposing said spring means,
the relationship of the pivotal axis of the annular members, the center of the annulus members and the center of the drive member being such that the fluid between successive piston members is subjected to a precompression as the piston members move between inlet and outlet positions and to a decompression as the piston members move between outlet and inlet positions.

15. In a pump, the combination comprising
a housing having an inlet and an outlet,
a pair of annulus members,
each said annulus member having an annular groove in a face thereof,
means for pivoting said annulus members in said housing about a common axis with the annular grooves thereof in opposed relation,
a plurality of segmental piston members in each said annular groove,
said segmental piston members being spaced from one another to define spaces therebetween,
a rotary drive member interposed between said annulus members,
said rotary drive member having a plurality of generally radially extending openings therethrough,
a sleeve interposed in each said opening,
a pin extending through each said sleeve and engaging opposed segmental piston members in the opposed annular grooves,
said housing having an inlet fluid passage extending from the path of the spaces between said segmental piston members to said inlet,
said housing having an outlet fluid passage extending from the path of the spaces between said segmental piston members to said outlet,
spring means yieldingly urging said annulus members into eccentric relation with respect to said rotary drive member,
and pressure responsive means opposing said spring means and tending to urge said rotary drive member into eccentric relation with said annular groove,
the relationship of the pivotal axis of the annular members, the center of the annulus members and the center of the drive member being such that the fluid between successive piston members is subjected to a precompression as the piston members move between inlet and outlet positions and to a decompression as the piston members move between outlet and inlet positions.

16. In a pump, the combination comprising
a housing having an inlet and an outlet,
an annulus member,
said annulus member having an annular groove in a face thereof,
means for pivotally mounting said annulus member in said housing,
a plurality of segmental piston members mounted in said annular groove,
a rotary drive member positioned adjacent said annulus member and having means thereon engaging said piston members, said housing having an inlet fluid passage extending from the path of the spaces between said segmental piston members to said inlet and an outlet fluid passage extending from the path of said spaces between said segmental piston members to said outlet, spring means yieldingly urging said annulus member into eccentric relation with respect to said rotary drive member, and pressure responsive means responsive to the outlet pressure opposing said spring means, the relationship of the pivotal axis of the annular members, the center of the annulus members and the center of the drive member being such that the fluid between successive piston members is subjected to a precompression as the piston members move between inlet and outlet positions and to a decompression as the piston members move between outlet and inlet positions.

17. In a pump, the combination comprising a housing having an inlet and an outlet, a pair of annulus members, each said annulus member having an annular groove in a face thereof, means for pivoting said annulus members in said housing about a common axis with the annular groove thereof in opposed relation, a plurality of segmental piston members in each said annular groove, said segmental piston members being spaced from one another to define spaces therebetween, a rotary drive member interposed between said annulus members, said rotary drive member having a plurality of generally radially extending openings therethrough, a sleeve interposed in each said opening, a pin extending through each said sleeve and engaging opposed segmental piston members in the opposed groove, said housing having an inlet fluid passage extending from said inlet to the spaces between said segmental piston members, said housing having an outlet fluid passage extending from said outlet to the spaces between said segmental piston members, and means for moving said rotary drive member into eccentric relation with respect to said annular groove, the relationship of the pivotal axis of the annular members, the center of the annulus members and the center of the drive member being such that the fluid between successive piston members is subjected to a precompression as the piston members move between inlet and outlet positions and to a decompression as the piston members move between outlet and inlet positions.

18. In a pump, the combination comprising a housing having an inlet and an outlet, a pair of annulus members, each said annulus member having an annular groove in a face thereof, means for pivotally mounting said annulus members in said housing about a common axis with the annular grooves thereof in opposed facing relation, a plurality of segmental piston members mounted in each said annular groove, a rotary drive member interposed between said annulus members and having means thereon engaging said piston members, said housing having an inlet fluid passage extending from the path of the spaces between said segmental piston members to said inlet and an outlet fluid passage extending from the path of said spaces between said segmental piston members to said outlet, arcuate inlet and outlet grooves in the faces of said annulus members which are opposite said faces in which said annular grooves are present, and pressure seals in said arcuate outlet grooves engaging surfaces of said housing.

19. In a pump, the combination comprising a housing having an inlet and an outlet, a pair of annulus members, each said annulus member having an annular groove in a face thereof, means for pivotally mounting said annulus members in said housing about a common axis with the annular grooves thereof in opposed facing relation, a plurality of segmental piston members mounted in each said annular groove, a rotary drive member interposed between said annulus members and having means thereon engaging said piston members, said housing having an inlet fluid passage extending from the path of the spaces between said segmental piston members to said inlet and an outlet fluid passage extending from the path of said spaces between said segmental piston members to said outlet.

20. In a pump, the combination comprising a housing having an inlet and an outlet, a pair of annulus members, each said annulus member having an annular groove in a face thereof, means for pivotally mounting said annulus members in said housing about a common axis with the annular grooves thereof in opposed facing relation, a plurality of segmental piston members mounted in each said annular groove, a rotary drive member interposed between said annulus members and having means thereon engaging said piston members, said housing having an inlet fluid passage extending from the path of the spaces between said segmental piston members to said inlet and an outlet fluid passage extending from the path of said spaces between said segmental piston members to said outlet, the pressure faces of the piston members forming an angle with a radial plane such that the center of the pressure force on each pressure face passes through the engaging means to said rotary drive member.

21. In a pump, the combination comprising a housing having an inlet and an outlet, an annulus member, said annulus member having an annular groove in a face thereof, means for pivotally mounting said annulus member in said housing, a plurality of segmental piston members mounted in said annular groove, a rotary drive member positioned adjacent said annulus member and having means thereon engaging said piston members, said housing having an inlet fluid passage extending from the path of the spaces between said segmental piston members to said inlet and an outlet fluid passage extending from the path of said spaces between said segmental piston members to said outlet, arcuate inlet and outlet grooves in the faces of said annulus members which are opposite said faces in which said annular grooves are present, and pressure seals in said arcuate outlet grooves engaging surfaces of said housing.

22. In a pump, the combination comprising a housing having an inlet and an outlet, an annulus member, said annulus member having an annular groove in a face thereof, means for pivotally mounting said annulus member in said housing, a plurality of segmental piston members mounted in said annular groove, a rotary drive member positioned adjacent said annulus member and having means thereon engaging said piston members, said housing having an inlet fluid passage extending from the path of the spaces between said segmental piston members to said inlet and an outlet fluid passage extending from the path of said spaces between said segmental piston members to said outlet, hydrostatic pressure seals in said last mentioned faces responsive to pressure in the areas between the inlet and outlet for applying varying forces to said annulus members.

23. In a pump, the combination comprising
a housing having an inlet and an outlet,
an annulus member,
said annulus member having an annular groove in a face thereof,
means for pivotally mounting said annulus member in said housing,
a plurality of segmental piston members mounted in said annular groove,
a rotary drive member positioned adjacent said annulus member and having means thereon engaging said piston members, said housing having an inlet fluid passage extending from the path of the spaces between said segmental piston members to said inlet and an outlet fluid passage extending from the path of said spaces between said segmental piston members to said outlet, the pressure faces of the piston members forming an angle with a radial plane such that the center of the pressure force on each pressure face passes through the engaging means to said rotary drive member.

References Cited
UNITED STATES PATENTS

| | | | |
|---|---|---|---|
| 727,171 | 5/1903 | Mayer | 103—129 |
| 983,605 | 2/1911 | Cole | 230—144 |
| 1,779,757 | 10/1930 | Strechkert | 103—120 |
| 1,997,233 | 4/1935 | Rodaway | 103—129 |
| 2,142,275 | 1/1939 | Lane | 103—120 |
| 2,149,143 | 2/1939 | Landenberger | 103—129 |
| 2,243,653 | 5/1941 | Rodaway | 103—120 |
| 2,489,931 | 11/1949 | Rodaway | 103—120 |

DONLEY J. STOCKING, *Primary Examiner.*

WILBUR J. GOODLIN, *Assistant Examiner.*